United States Patent [19]
Naber et al.

[11] Patent Number: 5,968,992
[45] Date of Patent: Oct. 19, 1999

[54] REDUCTION OF THE AMINE CONTENT OF RECYCLED POLYOLS

[75] Inventors: Bernhard Naber, Schwarzheide; Michael Gassan, Senftenberg; Thomas Schupp, Grünstadt; Sarbananda Chakrabarti, Mannheim, all of Germany

[73] Assignee: BASF Aktiengesellschaft, Ludwigshafen, Germany

[21] Appl. No.: 09/136,224

[22] Filed: Aug. 19, 1998

[30] Foreign Application Priority Data

Aug. 26, 1997 [DE] Germany .............................. 197 37 184

[51] Int. Cl.⁶ ...................................................... C08G 18/32
[52] U.S. Cl. ............................ 521/49.5; 521/163; 564/59; 564/78; 528/85; 252/182.26
[58] Field of Search .................................. 521/49.5, 163; 564/59, 78; 528/85; 252/182.26

[56] References Cited

U.S. PATENT DOCUMENTS 5,357,006  10/1994  Gassan et al. ........................... 525/453
5,616,623   4/1997  Münzmay ................................. 521/49

FOREIGN PATENT DOCUMENTS 42 34 335 A1   10/1992  Germany .
44 27 250 A1    8/1994  Germany .
44 42 379 A1   11/1994  Germany .
195 19 33 A1    5/1995  Germany .

*Primary Examiner*—Rachel Gorr
*Attorney, Agent, or Firm*—Fernando A. Borrego

[57] ABSTRACT

In a process for reducing the primary amine content of a composition comprising at least one polyol, in which a composition comprising at least one polyol is admixed with at least one isocyanate which contains only secondary and/or tertiary, aliphatically bound isocyanate groups, isocyanate is added in an amount of up to 5% by weight, based on the total composition, and a polyol preparation is obtained.

10 Claims, No Drawings

REDUCTION OF THE AMINE CONTENT OF RECYCLED POLYOLS

The present invention relates to a process for reducing the primary amine content of a composition comprising at least one polyol (deamination), in which the composition comprising at least one polyol is admixed with at least one isocyanate which contains only secondary and/or tertiary, aliphatically bound isocyanate groups. Furthermore, the invention relates to the use of such isocyanates for reducing the primary amine content of a composition comprising at least one polyol (deamination).

In the search for opportunities for materials recycling of polymeric plastic products, in particular polyaddition polymers, glycolytic cleavage of polyurethane-containing systems has already proven useful in the field of polyurethanes or polyurethane-containing plastics. The object of this process is to convert polyurethanes and/or polyurea-polyurethanes into liquid products containing OH groups by reaction with compounds containing at least two OH groups so as to reduce the molecular weight. In technical circles, the word "recycled polyols" has become established for these OH-containing products since they are obtained from used plastic products or production scrap in a reprocessing step. The recycled polyols can, for example, be reused for producing polyurethane materials, in particular for producing rigid PUR foams, but also for producing sealing compositions.

Processes for the glycolytic cleavage of polyurethane-containing polymers have been known for a long time. In the literature, the term "glycolysis" is frequently used instead of the term "glycolytic cleavage". This term should not be confused with the biochemical degradation of the body's energy reserves glycogen or starch in the human or animal body as described under the name "glyco-lysis" in relevant reference works (see, for example, Römpps Chemie Lexikon, 10th Edition, p. 1579). In the present text, the term "glycolytic cleavage" will therefore be used to avoid ambiguity.

For the purposes of the present text, "glycolytic cleavage" means a process in which a polymer is cleaved with the aid of an at least dihydric alcohol so as to reduce the molecular weight.

The methods known at present for glycolytic cleavage are distinguished by the glycols, catalysts and reaction conditions employed, with the glycols usually being used in a large stoichiometric excess. The known processes for glycolytic cleavage also form, for example as a result of the water content of the glycols or by means of glycolytic cleavage of urea groups, the parent amines of the isocyanates originally used for producing the polyurethane. The presence of these generally primary amines has an adverse effect on the processing properties of the composition comprising at least one polyol formed by means of the glycolytic cleavage. For example, the amines present in the composition comprising at least one polyol catalyze a future reaction with isocyanates to give polyurethanes, so that it is generally not possible to achieve sufficiently long processing times. Furthermore, the urea compounds formed from amines and isocyanates usually have an adverse influence on the material properties of the polyurethane resulting from isocyanates and the composition comprising at least one polyol. A further disadvantage of the presence of primary amines in the composition comprising at least one polyol obtained by glycolytic cleavage is the usually toxic properties of these amines. Since polyurethanes are generally produced at least in part using aromatic isocyanate compounds, the glycolytic cleavage forms primary aromatic amines whose carcinogenic, teratogenic and sometimes mutagenic potential is sufficiently well known.

There has therefore been no lack of attempts to convert the amines present in a polyol preparation into compounds which are "not harmful" in terms of what has been said above by reaction with compounds which are reactive toward amines. In the remainder of this text, this process will be summarized under the generic term "deamination".

Thus, for example, DE-A 195 19 333 proposes achieving the deamination by addition of carbonic esters. A disadvantage of this process is the low selectivity of the carbonic esters in relation to OH groups and amino groups, for which reason a large amount of carbonic ester has to be used to react with as large as possible a number of amino groups. On the one hand, this makes the economics of the process doubtful and, on the other hand, generally only a low product quality is achieved when polyurethanes are produced from such polyol preparations after the deamination.

DE-A 44 42 379 proposes carrying out the glycolytic cleavage under mild conditions using a very large excess of OH-containing compounds. For this purpose, the polyurethane-containing plastic to be dissociated is admixed with a polyol and is mixed and comminuted in a high-speed mixing and comminuting pump which generates high shear forces between rotor and stator. A disadvantage of this process is that only an extremely low recycling rate can be achieved in this way, since large amounts of polyol have to be added to the polyurethane-containing plastic.

The proposal to cleave polyurethane-containing plastics by means of organic acids leads to largely amine-free products. However, these are either completely unsuitable for producing new polyurethane plastics or they have very high viscosities and/or acid numbers (see, for example, DE-A-195 12 778) which likewise makes further processing difficult and generally leads to only low-value products.

DE-A-44 27 250 describes the use of cyclic carbonates as deaminating agents for polyol preparations obtainable from polyurethane-containing plastics. Disadvantages of this process are the unpleasant odor of the resulting products and the low selectivity in respect of OH groups and amino groups of the cyclic carbonate used for the deamination. Likewise problematical in the use of carbonates is the viscosity increase generally associated with the deamination.

DE-A-42 34 335 proposes carrying out the deamination by means of glycidyl ethers. However, this process, which is successful per se, has the disadvantage that the glycidyl ethers have to be used in a very high excess since they likewise lack selectivity in respect of amino groups and OH groups.

Owing to the known high reactivity of isocyanate groups toward OH groups, unsuccessful attempts have been made hitherto to use an isocyanate for deaminating a composition comprising at least one polyol.

However, it would be desirable to carry out the deamination of the composition comprising at least one polyol using isocyanates since the polyol preparation resulting from the deamination is, as a rule, in any case subsequently processed to form polyurethanes and in this way no compatibility problems between the compounds produced by the deamination and the urethane groups in the polyurethane would arise.

It is an object of the present invention to provide a process for reducing the primary amine content of a composition comprising at least one polyol (deamination) in which the deamination is carried out by means of isocyanates whose selectivity leads mainly to a reaction with the amino groups of the primary amines present in the composition comprising at least one polyol and in the case of which a reaction with the OH groups in the composition comprising at least one polyol is at least largely suppressed. A further object of the invention is to provide a process for deaminating a composition comprising at least one polyol which process does not significantly increase the viscosity of the composition comprising at least one polyol and thus gives a polyol preparation having good processability. Another object of the present invention is to provide a process which allows the primary amine content of a composition comprising at least one polyol to be reduced to less than 0.2% by weight, preferably less than 0.1% by weight. Furthermore, it is an object of the invention to provide a process for preparing polyol preparations from polyurethane-containing plastics which process encompasses a step for deaminating a composition comprising at least one polyol, where the deamination step has the abovementioned advantages compared to the prior art.

We have found that this object is achieved by a process for reducing the primary amine content of a composition comprising at least one polyol wherein a composition comprising at least one polyol is admixed with at least one isocyanate which contains only secondary or tertiary or secondary and tertiary, aliphatically bound isocyanate groups, where isocyanate is added in an amount of up to 5% by weight, based on the total composition, and a polyol preparation is obtained.

For the purposes of the present text, a "polyol preparation" is any preparation which comprises at least one polyhydric alcohol (polyol) or a mixture of two or more different polyhydric alcohols and which has been deaminated according to the process of the present invention. It is immaterial whether this preparation has been formed as a result of a chemical reaction or by physical mixing of individual components or by both processes simultaneously. Likewise, the way in which the amines have got into the polyol preparation is unimportant for carrying out the process of the present invention.

For the purposes of the present invention, a "composition comprising at least one polyol" is an amine-containing composition which comprises at least one polyhydric alcohol (polyol) or a mixture of two or more polyhydric alcohols.

The "composition comprising at least one polyol" used in the process of the present invention is preferably an amine-containing recycled polyol which is obtainable from the glycolytic cleavage of polyurethane-containing plastics.

For the purposes of the present invention, "polyurethane-containing plastics" are all plastics which comprise at least one polymeric compound containing at least one polyurethane bond. These include, for example, the polyurethanes obtainable from polyols and polyisocyanates and the polyurea-polyurethanes.

The polyurethane-containing plastics used for the glycolytic cleavage can further comprise, for example, mineral fibers, glass fibers, synthetic textile fibers, in particular those based on polyesters or polyamides or polyesters and polyamides, without interfering with the glycolytic cleavage. Likewise, the polyurethane-containing plastics may further comprise polymers which are obtainable, for example, by polymerization of ethylenically unsaturated monomers. These include, for example, polyacrylonitrile, copolymers of polystyrene/acrylonitrile, acrylonitrile/butadiene/styrene and other polymers which are introduced into the polyurethane by use of polymer polyols (graft polyols).

To carry out the glycolytic cleavage, the polyurethane-containing plastics are admixed with short-chain polyols, ie. compounds containing at least two OH groups, in the presence or absence of catalysts. The short-chain polyols usually contain two or three OH groups and in general not more than about 20 carbon atoms, preferably from 2 to about 8 carbon atoms, which may be separated by heteroatoms, preferably by oxygen atoms.

Particularly suitable short-chain polyols are ethylene glycol, oligoethylene glycols, propylene glycol, oligopropylene glycols, butanediols, neopentyl glycol, diethanolamine, methyldiethanolamine and triethanolamine. Particular preference is given to using diethylene glycol, triethylene glycol, dipropylene glycol, tripropylene glycol or mixtures of two or more thereof. Catalysts used are generally titanates, stannates or antimonates or mixtures of two or more thereof.

The mixing ratio of the polyurethane-containing plastics to the OH-containing, short-chain compounds is generally dependent on the chemical structure of the polyurethane-containing plastic used and also on the OH number of the OH-containing, short-chain compound used. The weight ratio of polyurethane-containing plastic to OH-containing, short-chain compound is generally from about 0.5:1 to about 3:1.

The reaction temperature prevailing in the glycolytic cleavage is usually set to from about 180° C. to about 250° C., preferably from about 200° C. to about 235° C. The reaction time is generally, depending on the crosslinking density of the polyurethane-containing plastic used, from about 1 to about 12 hours, preferably from about 2 to about 5 hours. The type of polyurethane which is present in the polyurethane-containing plastic is of no importance for the use in the process of the present invention. Examples of polyurethanes which can be treated by the process of the present invention are polyester-polyurethanes and polyether-polyurethanes.

After the glycolytic cleavage of the polyurethane-containing plastic is complete, the amine-containing composition comprising at least one polyol is generally first cooled to a temperature of at most about 100° C.

Accordingly, the invention likewise provides a process for preparing a polyol preparation from a polyurethane-containing plastic, in which a polyurethane-containing plastic is admixed with a polyol or a mixture of two or more polyols and is reacted at from about 180° C. to about 250° C., in the presence or absence of a catalyst, to give an amine-containing composition a comprising at least one polyol and, after a reaction time of from about 0.5 to about 12 hours, cooled to from about 20 to about 80° C., wherein the amine-containing composition comprising at least one polyol is subsequently admixed with at least one isocyanate which contains only secondary or tertiary or secondary and tertiary, aliphatically bound isocyanate groups, where the at least one isocyanate is added in an amount of up to 5% by weight and a polyol preparation is obtained.

Ideally, the addition according to the present invention of the at least one isocyanate is carried out at from about 10° C. to about 80° C., preferably at from about 20° C. to about 60° C. and particularly preferably at from about 25° C. to about 50° C.

The at least one isocyanate can be added stepwise, but it is also possible for the total amount of isocyanate to be added at once. Ideally, stirring is carried out during the addition of the at least one isocyanate. After the addition is complete, the mixture is stirred further for from about 10 to 180 minutes.

The at least one isocyanate is added in an amount of up to about 10% by weight based on the amine-containing composition comprising at least one polyol, preferably in an amount of from about 0.1 to about 5% by weight, and particularly preferably in an amount of from about 0.5 to about 3.0% by weight.

The glycolytic cleavage of the polyurethane-containing plastics is generally carried out for such a time as is needed to obtain a flowable, amine-containing composition comprising at least one polyol. The viscosity of the amine-containing composition comprising at least one polyol is advantageously up to about 8000 mPas (measured using a rotation viscometer at 25° C.). If desired, the viscosity can be influenced by addition of diluents, preferably reactive diluents, in particular polyhydric, low molecular weight alcohols. Examples of suitable reactive diluents are commercial polyols which are selected with a view to the properties to be achieved when using the polyol preparation in polyurethanes.

The polyol preparation obtainable after the deamination according to the present invention generally has a viscosity which is generally up to about 40% above that of the composition comprising at least one polyol. It is preferred that the viscosity of the polyol preparation does not exceed about 10,000 mPas. The polyol preparation preferably has a viscosity of from about 1500 mPas to about 8000 mPas.

Suitable isocyanates for carrying out the process of the present invention are isocyanates containing at least two isocyanate groups which are exclusively aliphatically bound in secondary and/or tertiary positions.

For the purposes of the present invention, preference is given to using at least one isocyanate of the formula (I)

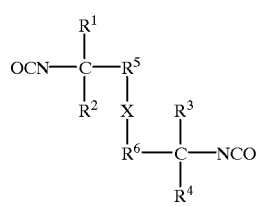

(I)

where X is a linear or branched, saturated or unsaturated alkylene group having from about 4 to about 8 carbon atoms or an unsubstituted, aliphatically substituted, aromatically substituted or heteroatom-substituted aromatic or cycloaliphatic ring system, $R^1$, $R^2$, $R^3$ and $R^4$ are, independently of one another, H or $C_1$–$C_6$-alkyl and $R^5$ and $R^6$ are, independently of one another, $C_1$–$C_4$-alkylene.

It is particularly preferred that the radical pair $R^1$, $R^3$ is different from the radical pair $R^2$, $R^4$ and each pair is either a pair of hydrogen atoms or a pair of $C_1$–$C_4$-alkyl groups.

An example of an isocyanate which can be used according to the present invention is 1,3-bis(2-isocyanatopropyl) benzene, also known as m-tetramethylxylylene diisocyanate (TMXDI) (CAS-No. 002778-42-9).

To carry out the glycolytic cleavage according to the present invention of polyurethane-containing plastics, the plastics are usually first comminuted, but uncomminuted polyurethane-containing plastics can also be subjected to the glycolytic cleavage.

The process of the present invention is not exclusively but particularly suitable for polyurethane-containing plastics which have been produced using diphenylmethane diisocyanate (MDI) or tolylene diisocyanate (TDI) or MDI and TDI.

The glycolytic cleavage is particularly suitable for the reprocessing of polyurethane-containing plastics as are obtained, for example, in the wrecking of old automobiles eg. in the reprocessing of automobile body parts, dashboards and automobile seats, but also of production scrap from the production of rigid, flexible, integral and block foams.

The polyol preparations which have been deaminated by the process of the present invention can be used subsequently to produce polyurethanes again. The polyol preparations have a very long shelf life, so polyurethane production can be carried out directly after the deamination or else after a relatively long storage time.

Accordingly, the invention also provides for a method of producing polyurethanes, characterized in that the polyurethanes are prepared from a polyol preparation obtained by a process for reducing the primary amine content of a composition comprising at least one polyol, wherein a composition comprising at least one polyol is admixed with at least one isocyanate which contains only secondary or tertiary or secondary and tertiary, aliphatically bound isocyanate groups, where the at least one isocyanate is added in an amount of up to 5% by weight, based on the total composition.

The invention also provides for a method of producing polyurethanes, characterized in that the polyurethanes are prepared from a polyol preparation obtained by a process for preparing a polyol preparation from a polyurethane-containing plastic, in which a polyurethane-containing plastic is admixed with a polyol or a mixture of two or more polyols and is reacted at from 180 to 250 ° C., in the presence or absence of a catalyst, to give a composition comprising at least one polyol and, after a reaction time of from 0.5 to 12 hours, cooled to from 20 to 80 ° C., wherein the composition comprising at least one polyol is subsequently admixed with at least one isocyanate which contains only secondary or tertiary or secondary and tertiary, aliphatically bound isocyanate groups, where the at least one isocyanate is added in an amount of up to 5% by weight.

The invention is illustrated by the following examples without being restricted thereby.

EXAMPLES

In all experiments, the polyurethane-containing plastic used was polyurethane scrap from operations which produce and process polyurethane.

The polyurethane-containing plastic was comminuted in a cutting mill to a size which enabled the material to be metered into a reactor and was subjected to the glycolytic cleavage without further treatment.

The glycol used for the glycolytic cleavage was placed in a flask provided with stirrer, dropping funnel, thermometer and reflux condenser and was admixed with 0.1% by weight of dibutyltin dilaurate as catalyst, calculated on the basis of the total batch.

After heating the glycol to about 210° C., the polyurethane-containing plastic was added at such a rate that the contents of the flask remained stirrable and the temperature remained constant. After the addition was complete, the reaction temperature of 210° C. was held for about 2 hours. The mixture was subsequently cooled to the reaction temperature indicated in Table 1, TMXDI was added and the mixture was stirred for the reaction time indicated in Table 1. After the reaction was complete, the polyol preparation was cooled and analyzed.

The polyol preparation was characterized by determining the OH number (titrimetric), the viscosity at 25° C. (rotation viscometer) and the primary amine content (high-pressure liquid chromatography, HPLC).

The following tables show the raw materials, the reaction conditions and the results.

Examples C1, C3, C5 and C7 are comparative examples without addition of TMXDI.

TABLE 1

| Ex. No. | PUR type | Ratio PUR:glycol | Glycol | TMXDI % by weight | Reaction Temp. °C. | Reaction Time h | Amine content % | Viscosity mpas | OHN mg KOH/g |
|---|---|---|---|---|---|---|---|---|---|
| C1 | Flexible foam, polyether/MDI | 1.7:1 | DPG | — | — | — | 2.31 | 4320 | 343 |
| 2 | " | 1.7:1 | DPG | 3.5 | 25 | 2 | 0.075 | 5740 | 322 |
| C3 | " | 1.8:1 | DPG | — | — | — | 1.85 | 3920 | 334 |
| 4 | " | 1.8:1 | DPG | 3.0 | 25 | 3 | 0.065 | 4950 | 318 |
| C5 | Rigid foam | 1:1 | DEG | — | — | — | 0.831 | 3950 | 598 |
| 6 | " | 1:1 | DEG | 0.7 | 50 | 1 | 0.041 | 4320 | 591 |
| C7 | PUR-RIM polyether/MDI | 1.5:1 | DEG | — | — | — | 1.02 | 2980 | 398 |
| 8 | " | 1.5:1 | DEG | 2.5 | 40 | 1.5 | 0.87 | 4530 | 371 |

Abbreviations:
PUR = Polyurethane
RIM = Reaction injection molding
MDI = Diphenylmethane 4,4'-diisocyanate

We claim:

1. A process for reducing the primary amine content of a composition comprising at least one polyol, wherein a composition comprising at least one polyol is admixed with at least one isocyanate which contains only secondary or tertiary or secondary and tertiary, aliphatically bound isocyanate groups, where the at least one isocyanate is added in an amount of up to 5% by weight, based on the total composition, and a polyol preparation is obtained.

2. A process as claimed in claim 1, wherein use is made of an isocyanate of the formula (I)

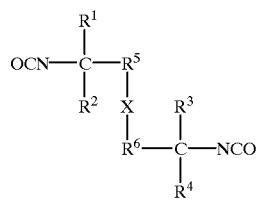

where X is a linear or branched, saturated or unsaturated alkylene group having 4 to 8 carbon atoms or an unsubstituted, aliphatically substituted, aromatically substituted or heteroatom-substituted aromatic or cycloaliphatic ring system, $R^1$, $R^2$, $R^3$ and $R^4$ are, independently of one another, H or $C_1$–$C_6$-alkyl and $R^5$ and $R^6$ are, independently of one another, $C_1$–$C_4$-alkylene.

3. A process as claimed in claim 2, wherein the radical pair $R^1$, $R^3$ is different from the radical pair $R^2$, $R^4$ and each pair is either a pair of hydrogen atoms or a pair of $C_1$–$C_4$-alkyl groups.

4. A process as claimed in claim 1, wherein 1,3-bis(2-isocyanatopropyl)benzene (TMXDI) is used as isocyanate.

5. A process as claimed in claim 1, wherein the composition comprising at least one polyol comprises a polyol obtained from polyurethane-containing plastics.

6. A process as claimed in claim 1, wherein the composition comprising at least one polyol has been obtained by glycolytic cleavage of polyurethane-containing plastics.

7. A process as claimed in claim 1, wherein the isocyanate is added in an amount of from 0.1 to 5% by weight, based on the composition comprising at least one polyol.

8. A process for preparing a polyol preparation from a polyurethane-containing plastic, in which a polyurethane-containing plastic is admixed with a polyol or a mixture of two or more polyols and is reacted at from 180 to 250° C., in the presence or absence of a catalyst, to give a composition comprising at least one polyol and, after a reaction time of from 0.5 to 12 hours, cooled to from 20 to 80° C., wherein the composition comprising at least one polyol is subsequently admixed with at least one isocyanate which contains only secondary or tertiary or secondary and tertiary, aliphatically bound isocyanate groups, where the at least one isocyanate is added in an amount of up to 5% by weight and a polyol preparation is obtained.

9. A method of producing polyurethanes, characterized in that the polyurethanes are prepared from a polyol preparation as claimed in claim 1.

10. A method of preparing polyurethanes, characterized in that the polyurethanes are prepared from a polyol preparation prepared as claimed in claim 8.

* * * * *